(12) United States Patent
Mills et al.

(10) Patent No.: US 8,448,136 B2
(45) Date of Patent: May 21, 2013

(54) CREATING A COMPOSITE PROGRAM MODULE IN A COMPUTING ECOSYSTEM

(75) Inventors: Michael I. Mills, Redwood City, CA (US); Justin M. Glaeser, Los Altos, CA (US); Sharla K. Fullerton, Brisbane, CA (US); Aline Baeck, Sunnyvale, CA (US); Kumiko T. Toft, Palo Alto, CA (US); Noah D. Shaffer, Pleasanton, CA (US)

(73) Assignee: Intuit Inc., Mountain View, CA (US)

( * ) Notice: Subject to any disclaimer, the term of this patent is extended or adjusted under 35 U.S.C. 154(b) by 1000 days.

(21) Appl. No.: 12/492,049

(22) Filed: Jun. 25, 2009

(65) Prior Publication Data

US 2010/0332581 A1    Dec. 30, 2010

(51) Int. Cl.
*G06F 9/44*    (2006.01)

(52) U.S. Cl.
USPC ........... 717/120; 717/107; 717/127; 717/162; 717/178

(58) Field of Classification Search
None
See application file for complete search history.

(56) References Cited

U.S. PATENT DOCUMENTS

| | | | | |
|---|---|---|---|---|
| 7,703,072 B2 * | 4/2010 | Nakamura et al. | ............ | 717/107 |
| 2003/0051077 A1 * | 3/2003 | Fengler | ............................. | 710/8 |
| 2004/0003389 A1 | 1/2004 | Reynar | | |
| 2005/0235248 A1 * | 10/2005 | Victoria et al. | ............... | 717/102 |
| 2006/0150188 A1 * | 7/2006 | Roman et al. | .................. | 718/104 |
| 2007/0168925 A1 * | 7/2007 | Bornhoevd et al. | ........... | 717/104 |
| 2007/0198969 A1 * | 8/2007 | Facemire et al. | ............ | 717/107 |
| 2007/0201654 A1 * | 8/2007 | Shenfield | ................. | 379/201.01 |
| 2008/0244526 A1 | 10/2008 | Chang | | |
| 2008/0244527 A1 | 10/2008 | Chang | | |
| 2009/0007088 A1 * | 1/2009 | Fischer et al. | ................. | 717/165 |
| 2009/0100377 A1 * | 4/2009 | Miyamoto et al. | ............ | 715/810 |
| 2009/0259987 A1 * | 10/2009 | Bergman et al. | .............. | 717/107 |
| 2010/0162232 A1 * | 6/2010 | Bhatia et al. | ................... | 717/178 |
| 2010/0174665 A1 * | 7/2010 | Lanng | ......................... | 705/36 R |
| 2010/0250336 A1 * | 9/2010 | Selinger et al. | ................. | 705/10 |

* cited by examiner

*Primary Examiner* — Isaac Tecklu
*Assistant Examiner* — Adam Conkey
(74) *Attorney, Agent, or Firm* — Park, Vaughan, Fleming & Dowler, LLP

(57) ABSTRACT

Methods are provided for creating a composite program module within a computing ecosystem. The ecosystem comprises physical and/or virtual computing resources of a company, department or other organization. When a user discovers a grouping of modules that is useful to him, the ecosystem or his workspace allows him to create a composite module that comprises the group of modules. He can then access their combined functionality by activating just the composite module, in which case all the modules are automatically opened, without having to activate each one individually. Further, the ecosystem may suggest complementary program modules to a user based on his pattern of activity with one or more other modules. A composite program module may be created to include a suggested complementary module, or just modules discovered independently by the user.

18 Claims, 10 Drawing Sheets

Ecosystem Apparatus 900

CREATING A COMPOSITE PROGRAM MODULE IN A COMPUTING ECOSYSTEM

BACKGROUND

The migration away from monolithic, shrink-wrapped application programs continues unabated. A current focus in application development is upon "cloud computing," wherein a user's computing device need not even store or maintain a copy of an application program in order to run it. Instead, the application is loaded from a remote location, perhaps across the Internet, an intranet or some other network. Data manipulated via the application may also be maintained remote from the computing device.

Cloud computing may free a user from being limited to using only those applications installed on his computing device, but is not a cure-all for computer users. For example, a user must know what application or applications he wishes to access and his device may need to be specifically configured to access them. He cannot easily discover new applications useful for a given task at hand, particularly in an environment in which a large number of applications are offered with little guidance on when or how to use them.

Specifically, typical cloud computing environments do not support in-line discovery of a different application, or composition of a new application, while performing a given task in a given application. Thus, discovery that a previously unknown or unused program works well with another is often left to happenstance.

Even if a user discovers that one program works well with another in terms of sharing data or producing a result that is better or greater than what is produced by each program operating separately, he cannot group or associate them as a package so as to readily invoke their combined functionality again in the future, or easily share his discovery with another user except by describing to the other user how to replicate his discovery.

SUMMARY

In some embodiments of the invention, methods are provided for creating a composite program or application module within a computing ecosystem.

The ecosystem comprises physical and/or virtual computing resources of a company, department or other organization. When a user discovers a grouping of modules that is useful to him, the ecosystem or his workspace allows him to create a composite module that comprises the group of modules.

By creating a composite program module, he can later access their combined functionality by activating just the composite module, in which case all the modules are automatically opened, without having to activate each one individually.

The composite module may be created in "ad hoc" fashion, without knowing ahead of time that the modules operate together or that they produce a beneficial result. In particular, he need not know ahead of time that two or more particular program modules function well together, but can take advantage of his discovery when it occurs.

In some embodiments of the invention, the ecosystem may suggest complementary program modules to a user based on an observed pattern of activity with one or more modules he is currently operating. A composite program module may be created to include a suggested complementary module, or just modules discovered independently by the user.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, methods are provided for discovering and/or creating an ad hoc composite program module within a computing ecosystem. The computing ecosystem modules include applications, utilities and/or other components for accomplishing various tasks.

For example, a small business ecosystem may be configured to provide program modules that may be useful to a small business, such as accounting, scheduling, contacts, mapping, word processing, and so on. A composite program module is an ecosystem module that comprises two or more other modules.

In some implementations, the ecosystem may comprise a cloud-based computing environment in which users operate individual computing devices configured to execute remotely located applications. Thus, a given user may access any module or component of the ecosystem from any computing device that is part of the ecosystem, without altering the configuration of the instant device. The ecosystem may also, or instead, comprise a number of computing devices having one or more locally installed program modules.

A computing ecosystem with which embodiments of the invention described herein operate may comprise any number and type of computing devices configured to operate any number and type of program modules. One feature of the ecosystem is the ability of users to access and manipulate data, using virtually any ecosystem modules, from virtually any computing device coupled to the ecosystem.

Creation of an ad hoc program module is facilitated by the ecosystem's ability to infer a user's intent or desire from a pattern of activity and help the user discover one or more ecosystem modules that may assist him or her. For example, if a user is observed to open a list of contacts and drag objects from the contact list into a calendar, the ecosystem may recognize a known pattern of work, such as the planning of a trip, the scheduling of a series of telephone calls, etc.

When a user's pattern of activity matches a known workflow, the ecosystem may suggest the user employ a complementary ecosystem module that he or she may not have been aware of. Such a module may comprise an optimized trip planner (e.g., for planning an efficient route between destinations), an accounting tool (e.g., to gather information regarding accounts payable or accounts receivable for contacts the user is going to call), etc.

In some embodiments of the invention, the process of matching a user's pattern of activity with known patterns or profiles of complementary program modules may also take into account other information regarding the user. For example, some complementary modules may or may not be suggested based on the user's role within the ecosystem or the organization that uses the ecosystem, his work responsibilities, his level of familiarity with the ecosystem, etc.

When the user accepts or activates a suggested program module, the ecosystem allows the user to combine the operative components (e.g., contact list, calendar, trip optimizer) into a new composite component. The user can then reuse the composite module as desired, to recreate the same trip or series of telephone calls or to plan a new trip or new series of calls. The user may also be able to share the composite module with other users, either directly (e.g., by sending the composite module or a reference to the module to a specific recipient) or indirectly (e.g., by making the composite module available to other ecosystem users via a catalog or directory).

Another illustrative use for an embodiment of the invention involves scheduling work. For example, in an automotive repair shop several vehicles may await work. Different repair jobs may require different parts, and different mechanics may have different skills. An embodiment of the invention may therefore merge a calendar or scheduling module with a mechanic module that reflects the mechanics' aptitudes with different tasks, and with a delivery module that indicates when various parts will be delivered to the repair shop.

In another illustrative embodiment of the invention, a composite module may be developed to facilitate customer management. For example, such a composite module may incorporate a record or history of customer complaints with an invoicing or accounting module that shows the customers' transactions/billing/invoicing status. Various other helpful composite program modules may be developed, depending on the host ecosystem, the variety of program modules within the ecosystem, etc.

Figure 1:
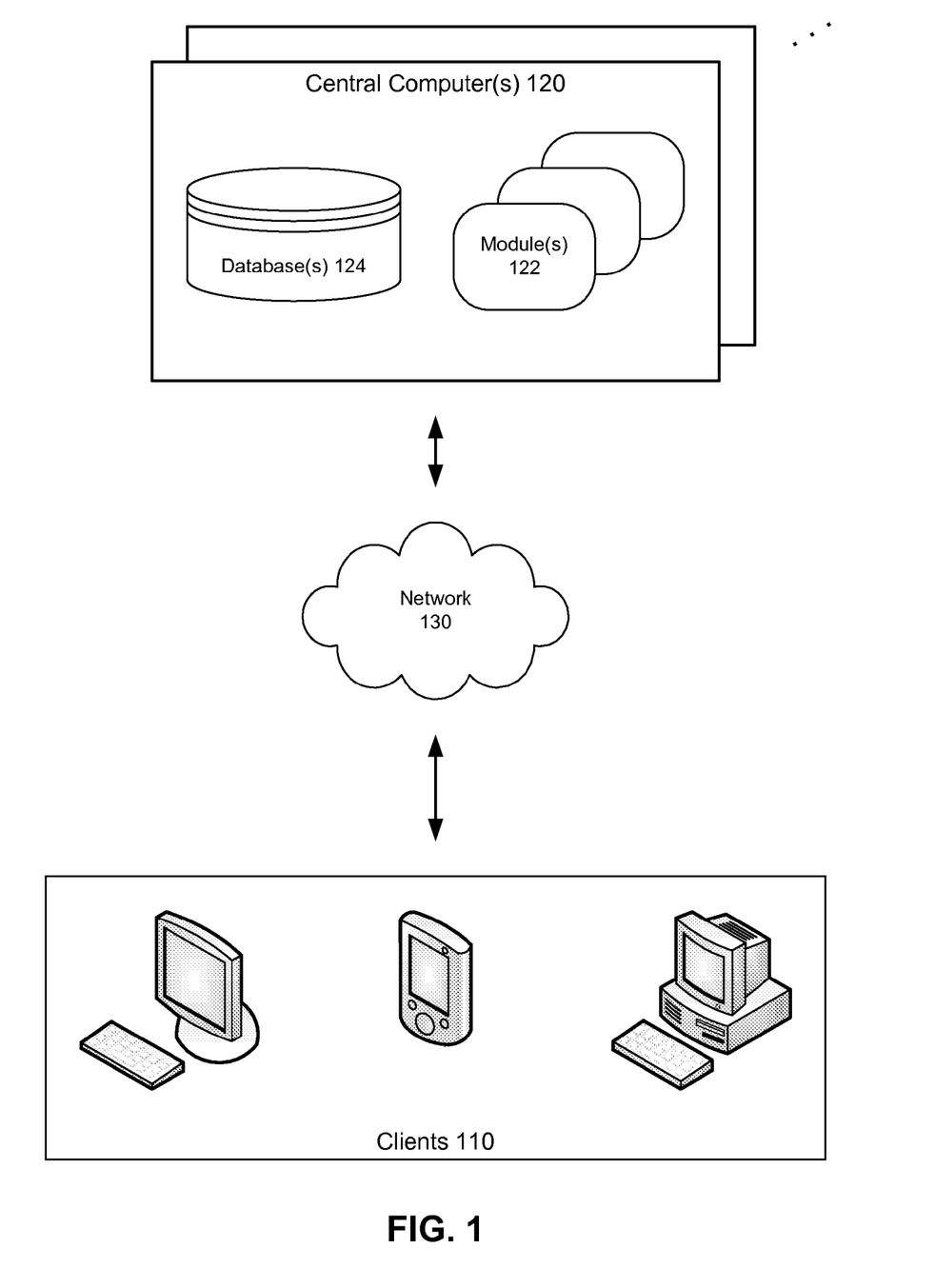
FIG. 1 is a block diagram of a computing ecosystem that promotes in-line discovery of program modules and easy creation of a composite program module, in accordance with some embodiments of the present invention.

FIG. 1 is a block diagram of an ecosystem or other computing environment supporting the discovery and/or creation of a composite program module, according to some embodiments of the invention.

In these embodiments, computing devices 110 are operated by users to execute applications, utilities and/or other ecosystem module 122 stored on central computer(s) 120. Computing devices 110 may include various types of devices, such as desktop computers, servers, laptop or other portable computing devices, portable digital assistants, etc.

Central computer(s) 120 may comprise computer servers configured to serve the program module, and may also act as web servers, data servers and/or other specialized or general-purpose computer systems. In different implementations, the central computer(s) may be logically and/or physically dispersed or collocated.

Ecosystem module 122 may include programs for word processing, manipulating spreadsheets, accessing a database, managing electronic mail, scheduling, mapping, maintaining a set of contacts, etc. Central computer(s) 120 also stores data (e.g., database(s) 124), which may be manipulated by clients 110 (and/or central computer(s) 120) when module(s) 122 are executed on the computing devices. Multiple different modules may operate on or manipulate a single set of data, such as a user's contact list, word processing documents, etc.

The ecosystem of FIG. 1, such as central computer(s) 120, may be maintained by a particular organization. However, other organizations and people may design or contribute modules for use within the ecosystem.

When a user works within the ecosystem, a user interface device (e.g., monitor, CRT) presents the user with a workspace through which he or she may access the various ecosystem modules, access or manipulate his or her data (and/or other users' data), maintain his or her ecosystem profile, etc. The ecosystem enables use of a single identity for the user across some or even all modules, and manages security of the components and data, thereby facilitating sharing of data between modules, interoperability of ecosystem components, and other productivity gains.

Figure 2:
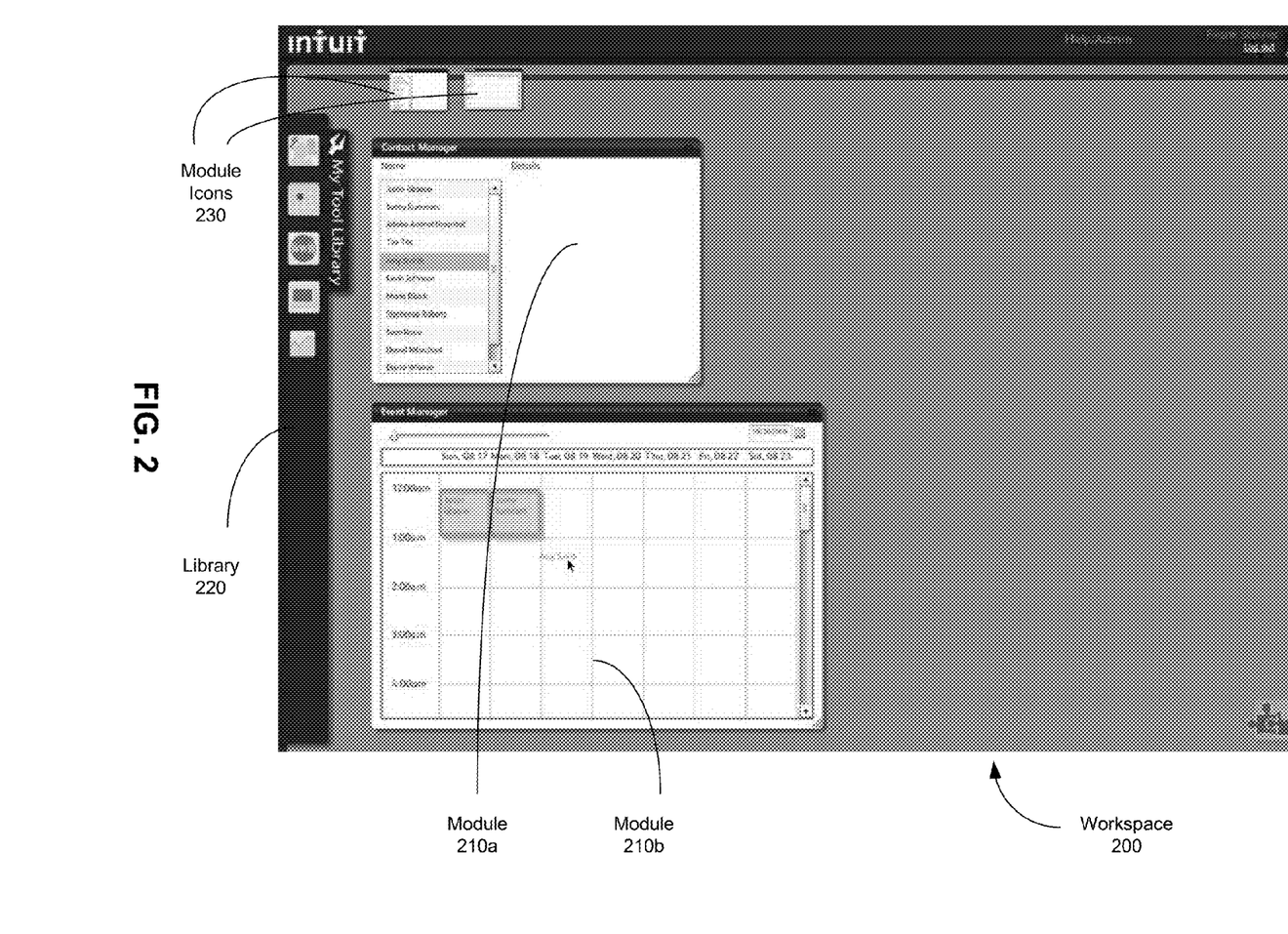
FIG. 2 is a screen shot of a user's workspace for executing program modules within a computing ecosystem, in accordance with some embodiments of the present invention.

FIG. 2 is a snapshot of a user's workspace within a computing ecosystem that promotes in-line discovery of program modules and creation of composite modules, according to some embodiments of the invention.

In FIG. 2, user workspace 200 may be designed to resemble a physical or electronic computer-based desktop, in that it serves as a work area in which a user may manipulate one or more ecosystem program modules. In FIG. 1, two ecosystem modules 210a, 210b are currently open or active, meaning that they are being executed.

Library 220 or a toolbar provides quick access to a subset of program modules offered by the ecosystem. For example, whenever the user downloads or uses a module for the first time, or modifies his profile to include the module, an icon for that module may be placed in library 220. The corresponding module or application may be opened by clicking (e.g., double-clicking) an icon in the library, dragging it to the workspace, or taking some other action.

When a module is opened or activated within workspace 200, module icons 230 are placed around or within the workspace. These module icons can be manipulated by the user to take action regarding the corresponding module or modules. For example, by selecting one or more of them (e.g., by clicking them, by drawing a box around them), he may close them all simultaneously by selecting a menu option, dragging them off the workspace or back into library 220, etc.

Figure 3:
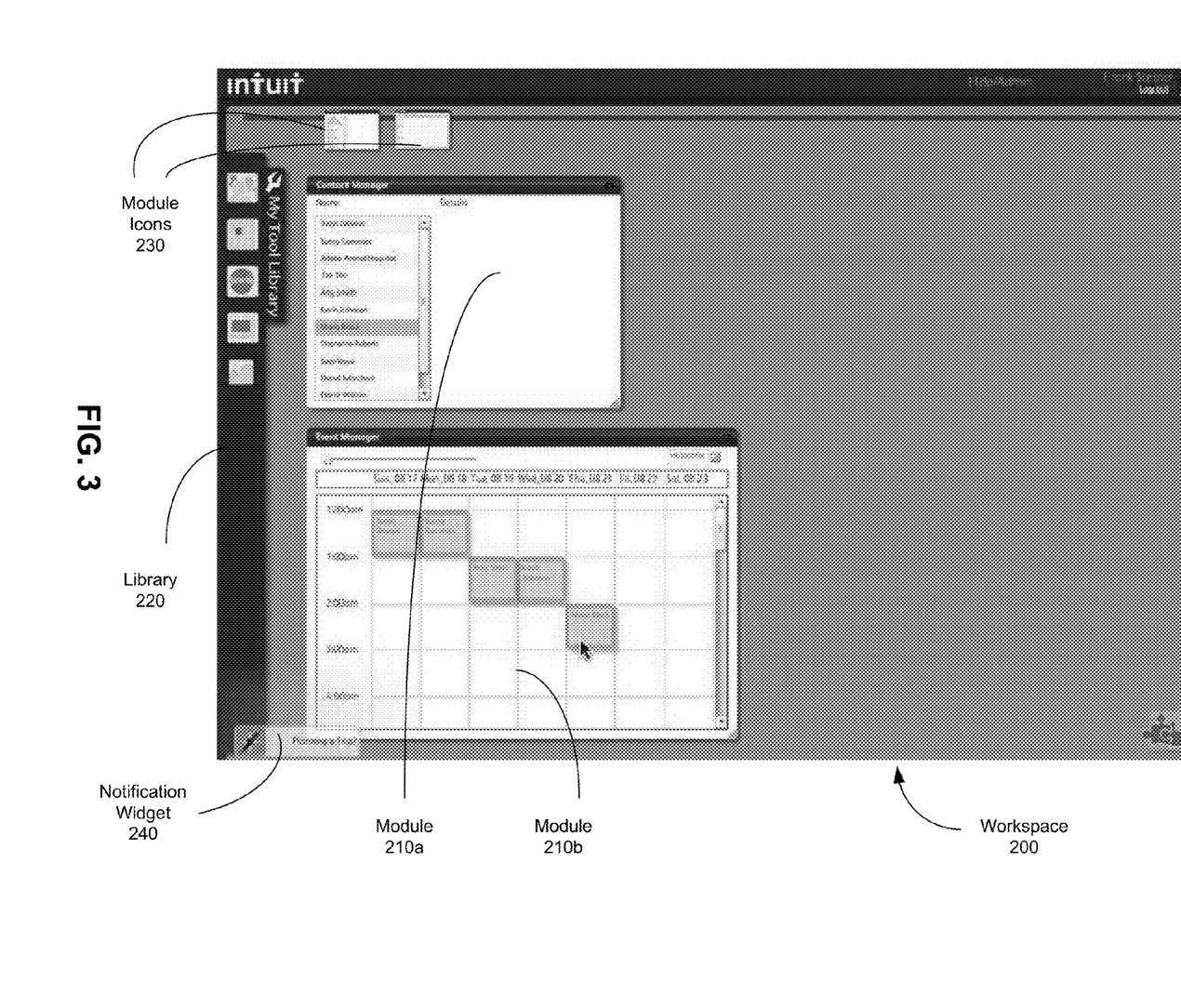
FIG. 3 is a screen shot of the workspace of FIG. 2, demonstrating a workflow pattern monitored and recognized by the ecosystem, in accordance with some embodiments of the present invention.

FIG. 3 is a snapshot of workspace 200 while the user is manipulating the modules and the ecosystem recognizes a pattern of activity, in accordance with some embodiments of the invention. In particular, the user is currently in the process of dragging one or more contacts from contact module 210a to calendar module 210b.

In the illustrated embodiments of the invention, the ecosystem monitors the user's activity and, after some threshold number of times of observing a recognized pattern of behavior (e.g., 1, 2, 3), the ecosystem alerts the user to the availability of one or more program modules that complement the user's activity.

The modules may be considered complementary because they are configured to perform a task or tasks that are sometimes performed, or can be performed, in conjunction with the observed behavior. Some complementary modules may be independent (e.g., generate their own output or perform their task without interaction with another module), while others operate cooperatively with one or more other program modules.

In FIG. 3, the alert comprises notification widget 240, which may be displayed in any location of the user's workspace or video interface device (e.g., in a corner of the workspace). The alert may be purely visual in nature (and may blink, change size or color or exhibit other behavior intended to attract a user's attention) or may include an audible component as well.

The alert may fade away after some period of time (e.g., 1.5 seconds) if the user takes no action regarding the alert (e.g., clicking on it, mousing-over it). If she selects the alert, further information regarding the complementary module(s) is provided, as shown in FIG. 4.

Figure 4:
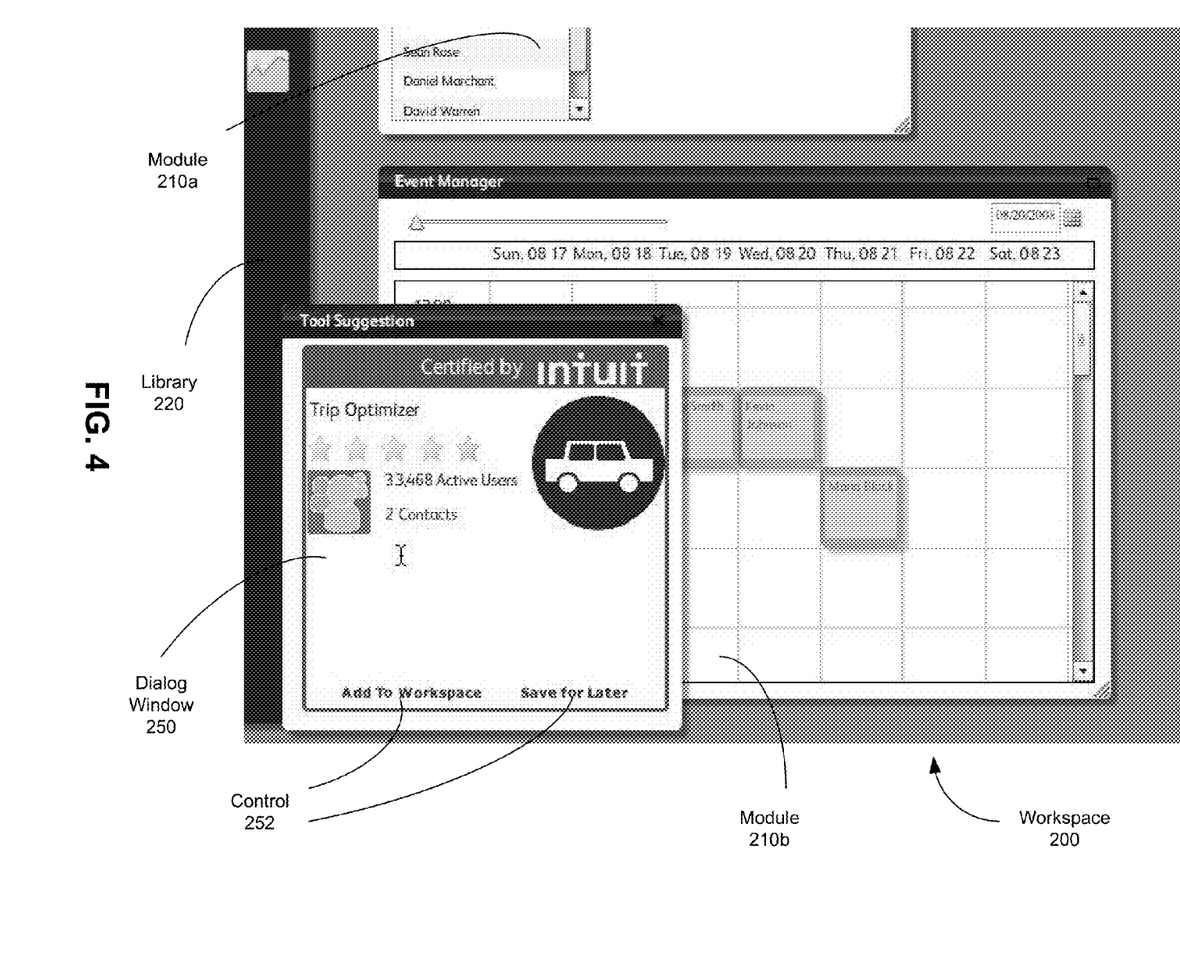
FIG. 4 is a further screen shot of the workspace of FIG. 3, wherein the ecosystem alerts the user of the availability of a complementary program module, in accordance with some embodiments of the present invention.

FIG. 4 is an expanded snapshot of a portion of workspace 200 as it may appear when a user investigates a suggested complementary program module, according to some embodiments of the invention.

In FIG. 4, the user has selected (e.g., clicked on) notification widget 240 of FIG. 3, and is presented with a dialog window or other interface offering further information regarding the suggested module or modules. The figures illustrate a Trip Optimizer module, but embodiments of the invention described herein are not limited to discovery of any particular type of program module.

Dialog window 250 may present a variety of information, such as a name and/or description of a suggested complementary module, a rating (e.g., reflecting other ecosystem users' opinions of the module), an indication of its popularity (e.g., how many users have it in their workspace libraries 220), etc.

In some embodiments, the user may be offered a chance to view a video or movie clip showing how the complementary module works or what it can do for her.

The window may offer various controls 252, for opening the complementary module now in workspace 200, saving the module for later (e.g., by placing an icon in the user's library 220), being reminded of the module at a later time, etc. The user may close the dialog window or ignore it if she is not interested is using the suggested module(s).

Figure 5:
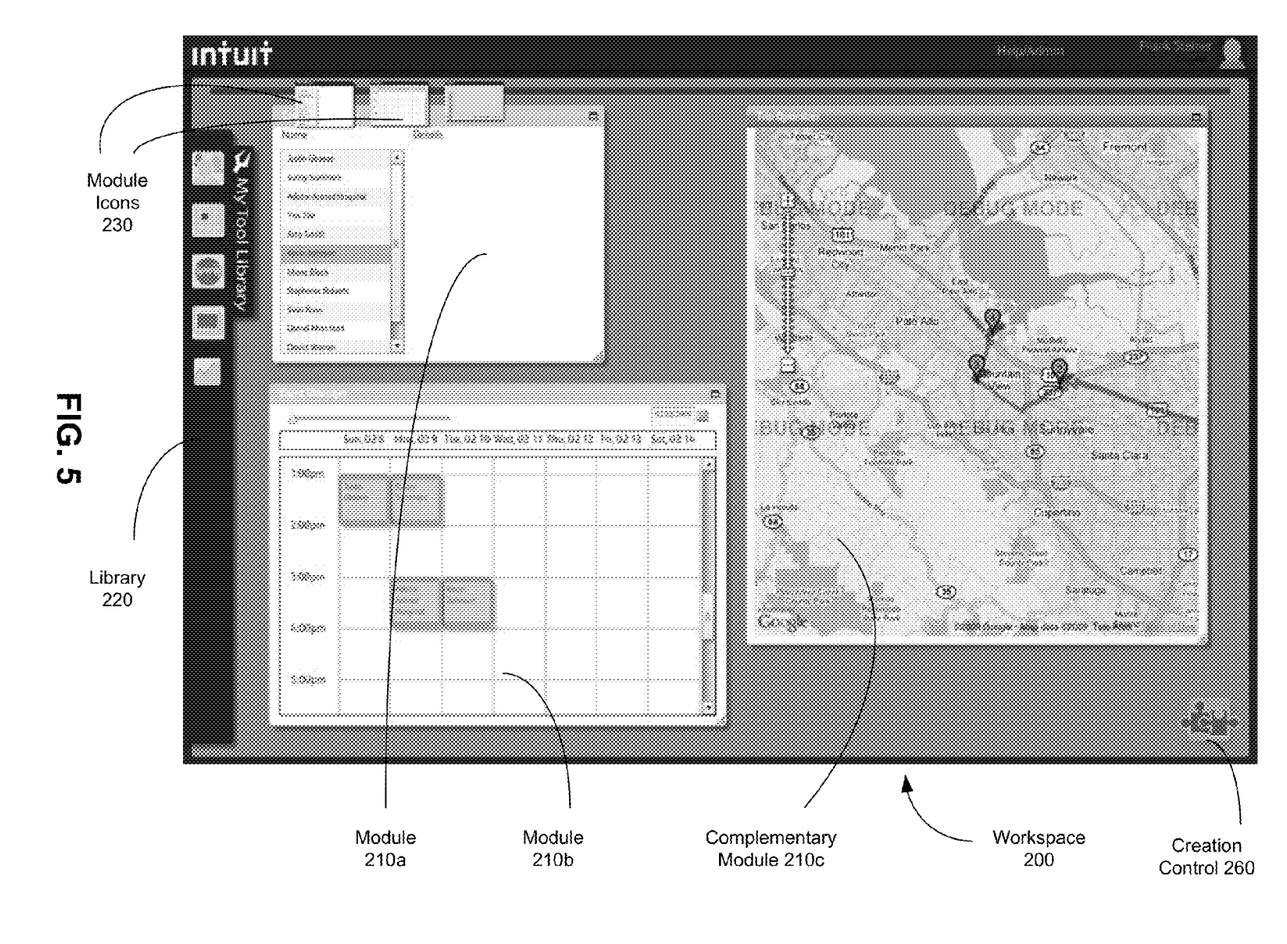
FIG. 5 is a further screen shot of the workspace of FIG. 4, depicting the execution of a suggested complementary program module in addition to other program modules, in accordance with some embodiments of the present invention.

FIG. 5 is a further snapshot of workspace 200 as it may appear when a user accepts a suggested complementary program module and it is opened in her workspace, according to some embodiments of the invention.

In. FIG. 5, complementary module 210c has been opened in workspace 200 in response to the user's action in the alert's dialog window. In some implementations, the arrangement, size or position of other open modules may be modified to allow the selected complementary module to be displayed.

In the illustrated implementation, the selected Trip Optimizer module automatically plans and maps an optimal route between addresses of the contacts that have been added to the calendar/scheduling module. If additional contacts are dragged to the calendar module while the Trip Optimizer module is open, they will also be mapped.

The trip is planned in such a manner as to allow the user (or other person) to reach each selected contact at a specified time (e.g., as indicated by the calendar time slot to which the contact was dragged). The Trip Optimizer may thus include or call upon a program module that can map between addresses, or may invoke an external service (e.g., a $3^{rd}$ party web site that provides mapping or directions, a service that provides traffic updates) if necessary.

Trip optimizer 210c of FIG. 5 has been configured to operate cooperatively with a contacts module (module 210a) and a calendar module (module 210b). In other embodiments, it may also interact with other program modules (and even activate one or more if not already open), such as an accounting program to obtain outstanding invoices for one or more of the contacts to be visited during the user's trip.

When the user elects to accept or open a suggested complementary program module, an icon for that module may or may not be saved to library 220. For example, the ecosystem may await confirmation from the user that she wishes to save a shortcut (i.e., the icon) and does not wish to abandon the module (e.g., because she does not like it or does not find it useful).

In FIG. 5, workspace 200 has been augmented with creation control 260, which triggers the creation of a new program module. In particular, by activating or invoking control 260, the user instructs the ecosystem (or her workspace) to generate a composite program module that comprises all (or specified) program modules currently open within her workspace.

Creation of the new composite module may be done automatically when the user activates control 260 (e.g., to include all open modules), or a dialog window or other interface may be presented to prompt the user to select which modules are to be included in the composite.

Figure 6:
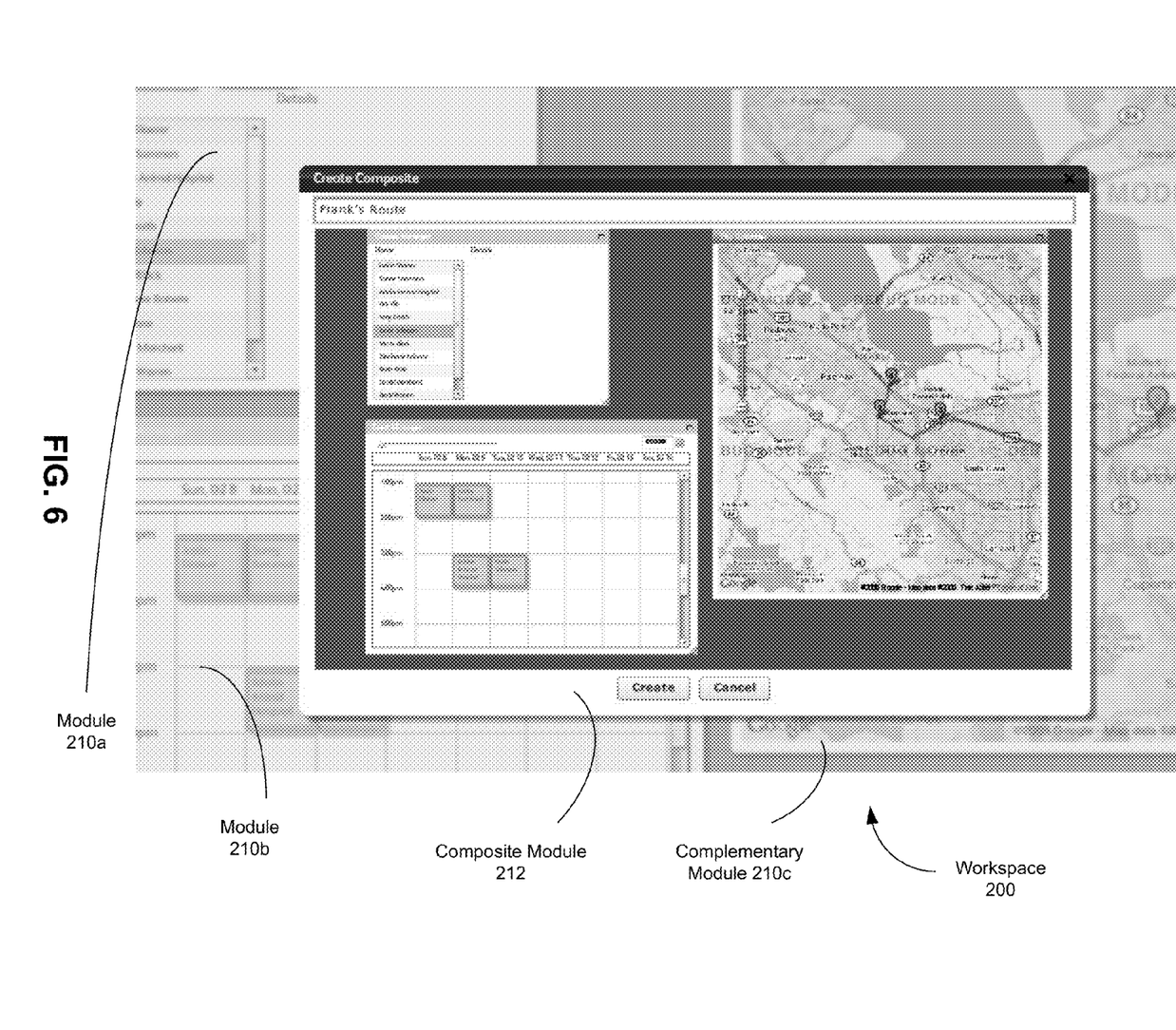
FIG. 6 is a further screen shot of the workspace of FIG. 5, depicting the creation of a composite program module comprising the complementary program module and other program modules, in accordance with some embodiments of the present invention.

FIG. 6 is an expanded snapshot of a portion of workspace 200 showing the creation of a composite program module, according to some embodiments of the invention. In order to fully and clearly illustrate the new module, the view omits the edges of some portions of workspace 200.

In particular, a representation of the new composite module 212 is placed on top of the workspace (and may therefore cover or block portions of some or all of the modules that comprise the new module). Portions of constituent modules 210 are visible underneath composite module 212.

Subsequent to creation of composite module 212, and as shown in FIG. 6, the user may cancel creation of the new module or accept it, using controls provided in a dialog window associated with the module's creation. The user may also be able to enter a name for the module (e.g., in a text box near the top of the window).

It should be noted that while composite program module 212 was created to include a newly suggested and "discovered" program module in the embodiments of the invention reflected in FIG. 6, in other embodiments of the invention a user may be able to create a composite program module from any group of multiple program modules (i.e., without first having to accept a suggested complementary module).

In response to the user's creation of composite program module 212, a new module icon knot shown in FIG. 5) is added to the user's library 220. When the user activates the new icon in the future, in different implementations the composite module may activate differently.

For example, activating the composite module may cause all constituent modules (i.e., modules 210a, 210b, 210c) to open with the same spatial arrangement they had at the time composite module 212 was created.

However, in some implementations, the constituent modules may open with the same data they possessed or were operating on when the composite module was created, or the same data they were using when the composite module was last closed. For example, contacts module 210*a* may retain all of its contacts, while the calendar or scheduling module 210*b* may open to the same date/time and with the same appointments (i.e., dragged contacts) that the module exhibited when module 212 was created. Similarly, Trip Optimizer module 210*c* may open with the same data points (addresses) that it had mapped when module 212 was created.

In other implementations, some constituent modules may open without any initial data. For example, contacts module 210*a* will likely always open with its aggregated data (i.e., all contacts that the user has saved). However, calendar module 210*b* and/or Trip Optimizer module 210*c* may be opened without any appointments or addresses (i.e., blank), without any appointments or trip destinations previously made by dragging contacts from module 210*a*, or in some other manner.

In yet other embodiments, a user may be queried as to how a composite module should be opened—with previous data, with a set of data identified by the user, with a blank set of data, or in some other manner.

However the composite module behaves when activated, it may be noted that the user is able to quickly access the functionality of the module (e.g., by activating a single icon). In computing environments in which composite modules cannot be created, she would have to separately invoke each constituent program module every time she wanted to plan an optimized trip.

In some embodiments of the invention, the layout of module icons 230 (shown in FIG. 5) is modified for a composite module. For example, instead of displaying a separate module icon for each module within a composite module, the composite module may be represented by an icon comprising a set of nested module icons representing the individual constituent modules. Thus, as with module icons representing independent modules, all elements of the composite module may be closed (or minimized or otherwise manipulated) together.

Figure 7:
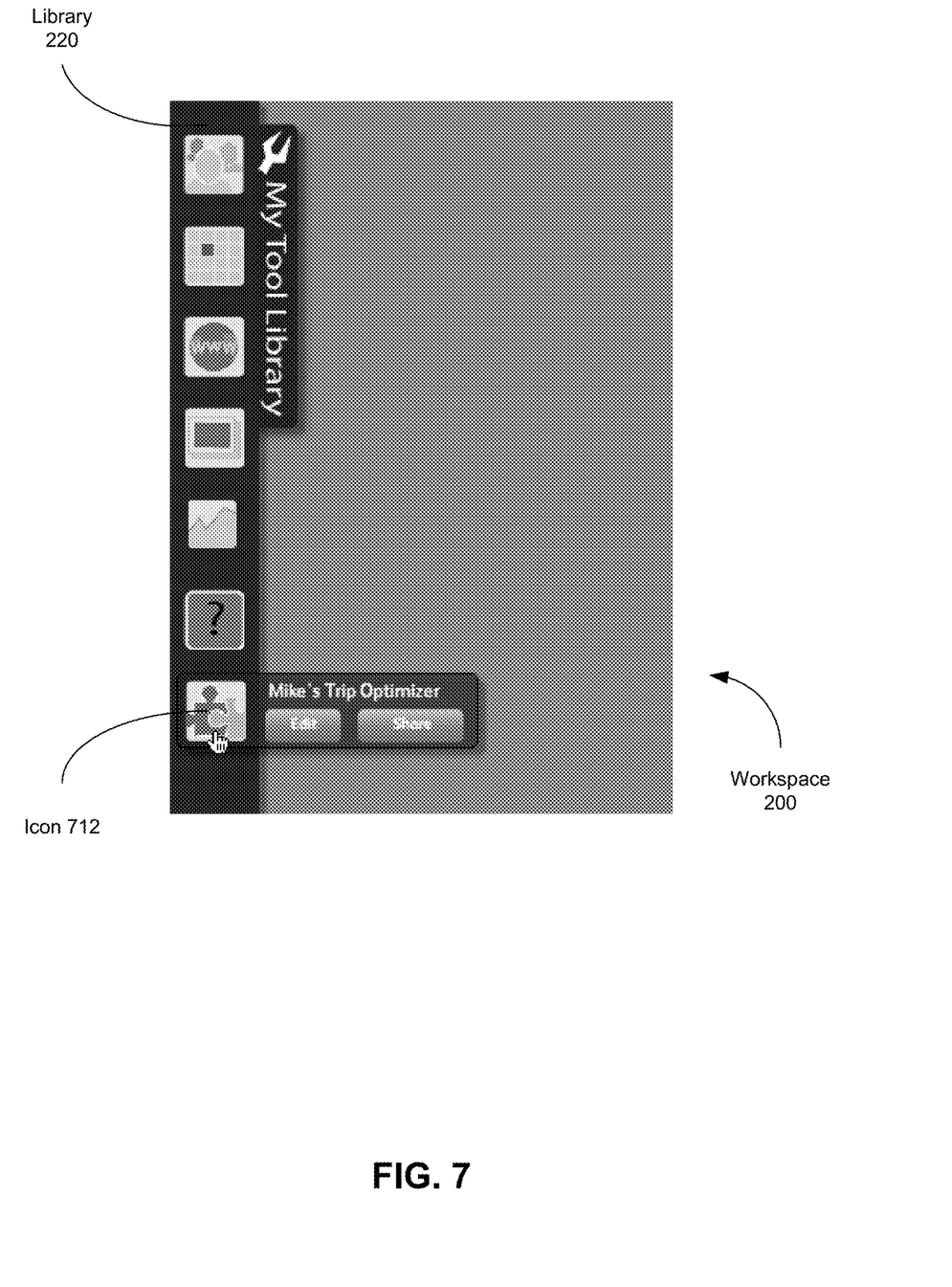
FIG. 7 is a screen shot depicting the creation of a toolbar or library icon for a composite program module, in accordance with some embodiments of the present invention.

FIG. 7 is a snapshot of a portion of workspace 200 showing a toolbar icon for launching a composite program module, according to some embodiments of the invention. In order to fully and clearly illustrate the module's icon, the view omits some portions of workspace 200.

As shown in FIG. 7, a new icon 712 is added to library 220 to allow the user to quickly open composite module 212 (e.g., by left-clicking, by double-clicking, by dragging it to the workspace). Mousing-over or right-clicking the icon may present the user with other options.

In particular, FIG. 7 reflects the user's ability to share the new composite module with other users. Illustratively, she may be able to forward it to specific users, or register it in a catalog of program modules hosted by the ecosystem. She may also be able to edit it (e.g., to change its name, change the layout of the constituent modules). Some of all of these options may remain available to her via the new module's icon in library 220.

In some embodiments, a user may be able to edit a composite program module to include one or more additional modules. Thus, she may discover that another ecosystem module can cooperate with the composite module, or may try using various modules with the composite module.

When a composite program module is shared with another user, and that user opens the composite module, it may open with default data from the other user (i.e., with that user's contact list and schedule), but without an initial set of appointments or trip destinations.

The originating user (i.e., the user that created the composite module) may, however, be able to specify that the composite module should open for another user with a set of data specified by the originating user.

Figure 8:
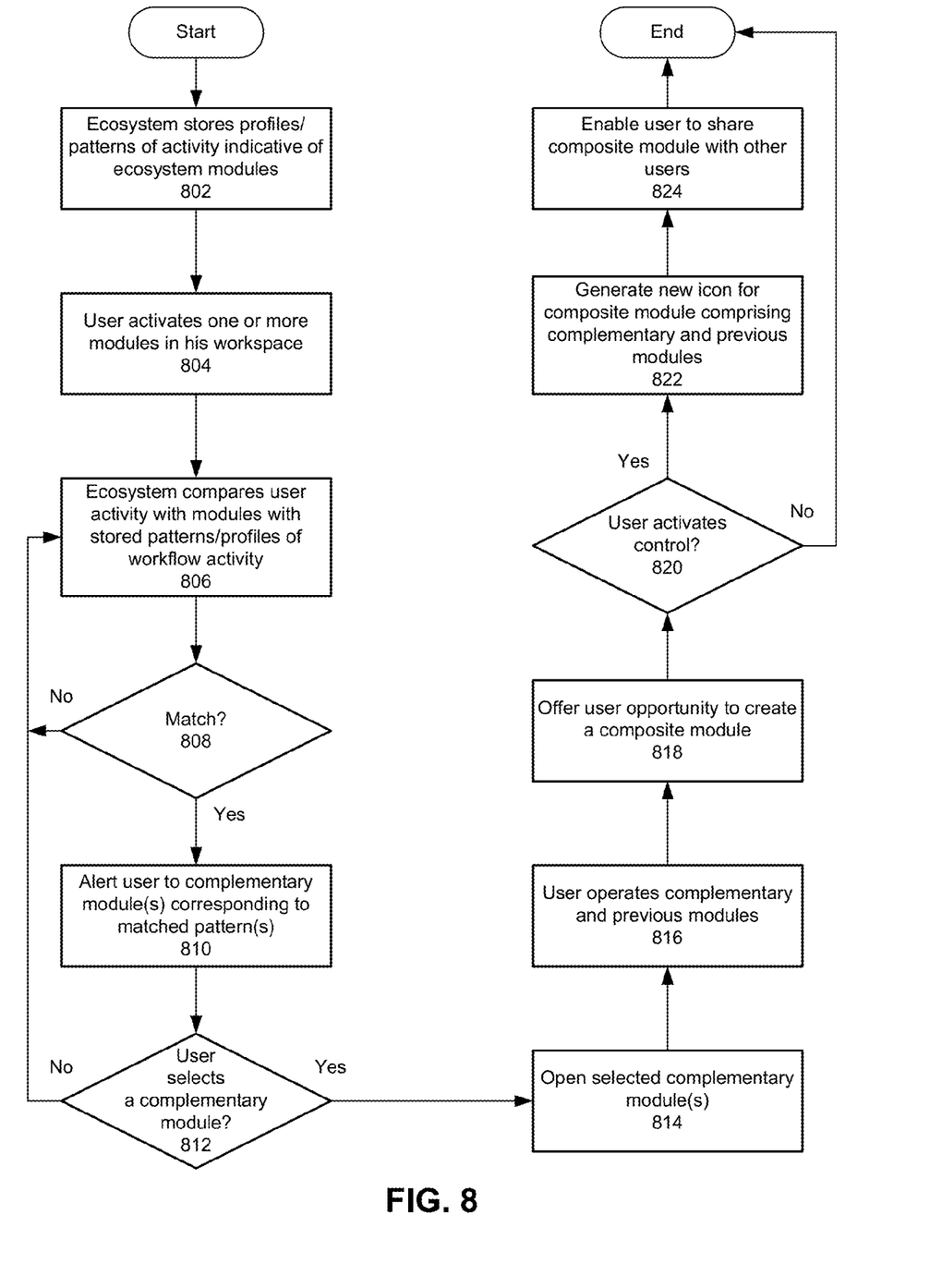
FIG. 8 is a flowchart demonstrating a method of creating a composite ecosystem component from two or more preexisting components, in accordance with some embodiments of the invention.

FIG. 8 is a flowchart demonstrating a method of generating a composite program module within a user's workspace of a computing ecosystem, according to some embodiments of the invention.

In operation 802, the ecosystem stores patterns or profiles of workflow activity that are indicative or representative of particular complementary program modules available to users within the ecosystem. More particularly, the patterns describe behavior that, when replicated by a user, may indicate the user is performing or wishes to perform a task that can be accomplished by the corresponding program module.

For example, repetitive user behavior such as dragging contacts from a contact list to a calendar or scheduling module may match a pattern associated with planning a trip or scheduling a series of telephone calls. Or, dragging individual files from one folder or directory to another may match a workflow pattern indicative of a program module for making an archive or a backup.

Any number of activity patterns may be saved for any number of modules, and more than one pattern may correspond to a given module, depending on its functionality. New patterns and profiles may be added over time to the ecosystem's repository, such as when new program modules are released.

In operation 804, a user activates one or more program modules within her workspace. Such activation may entail clicking on icons associated with the modules, dragging the icons to the user's workspace or a desktop within the workspace, etc.

In operation 806, as the user manipulates the program modules, the ecosystem monitors her activity to compare it to the stored patterns or profiles of workflow activity. The monitoring may be performed in real-time or may be slightly delayed so as not to interfere with the user's actual activity.

In operation 808, the ecosystem determines whether a current pattern of activity (e.g., a series of operations, key presses, mouse movements) match a stored pattern. If so, the method advances to operation 810; otherwise, the method returns to operation 806 to continue monitoring.

In operation 810, the user is alerted to the availability of a complementary program module that offers functionality the user may wish to employ. Any number of complementary modules may be suggested, and the user may be alerted audibly and/or visibly (e.g., by a notification icon in her workspace).

In some embodiments of the invention, the user may be able to take some action to receive further information regarding a suggested complementary program module. For example, by mousing-over or clicking on an icon associated with the notification or with a specific complementary module, the user may be given the option to view a description of the module to learn its functionality, to view a video showing how the module works, to request a module never be suggested again, etc.

In operation 812, the ecosystem determines whether the user has accepted a complementary module for current use. If so, the method advances to operation 814; otherwise, the method returns to operation 806 after some period of time (thereby giving the user sufficient time to accept a suggestion).

In operation 814, the selected complementary program module is opened in the user's workspace. It may be opened as if it was being opened for the first time by a new user (i.e., with no initialization), or may be opened to a state reflecting how it would appear if the user had been operating the module since the start of a monitored sequence of activity. In particular, it may be populated with data the user had manipulated during the monitoring of her activity, may be opened to a task compatible with what the user has done with the other program modules, etc.

In operation 816, the user operates the complementary program module and the previously opened modules as desired. Illustratively, she may access a tutorial or other help resource for the complementary module to see how it works or how it works with the other modules.

In operation 818, the user is offered the opportunity to create a composite program module comprising the complementary module and some or all of the previously opened modules (i.e., the modules with which the complementary module cooperates). This offer may be made as soon as the user accepts and begins using the complementary program module, or after some period of time of using it.

In operation 820, the ecosystem determines whether the user has accepted or activated a control associated with creation of the composite module. If so, the method advances to operation 822; otherwise, the method may end, may offer the option again at a later time, or may return to monitoring the user's activity to determine whether another complementary program module may be of use.

In operation 822, the ecosystem generates a new icon for the composite program module and stores it with icons for other program modules (e.g., in a library, in a toolbar, in a directory).

If and when the user activates the composite program module's icon, the complementary and preceding program modules may be opened with the same spatial arrangement they possessed when the user implemented the control for making the composite module. Thus, each module may be opened to the same state, and with the same data, as it was being operated with at that time. This allows the user to resume where she left off work previously, review what she has accomplished with the modules, etc.

In other embodiments of the invention, the program modules may be opened to initial or intervening states. In these embodiments, the user may start a fresh chore or task with the modules instead of returning to the previous use.

In operation 824, the user is able to share the composite program module with other ecosystem users. He may be able to do so by emailing to a user a link to the composite module, by adding the composite module to a catalog of ecosystem program modules, or by taking some other action.

Figure 9:
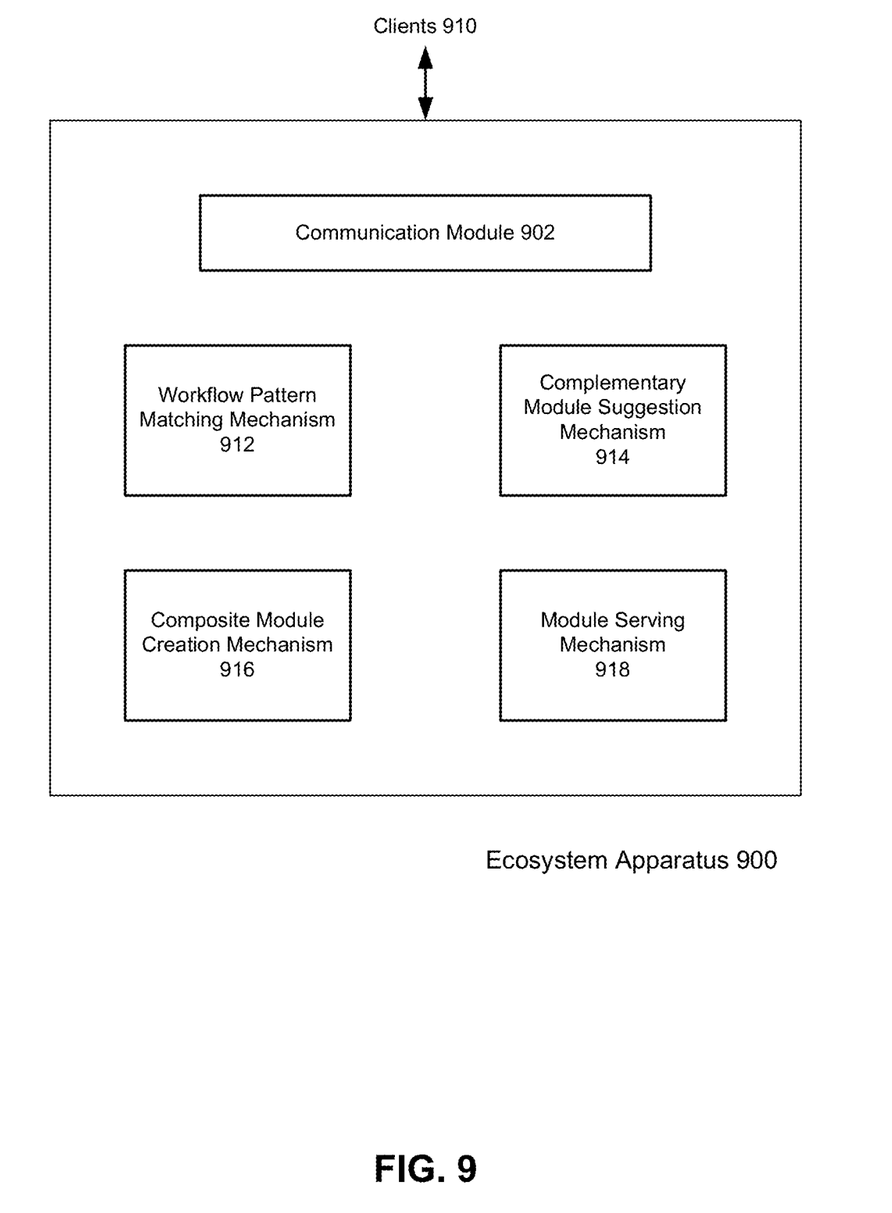
FIG. 9 is a block diagram of apparatus for creating a composite program module in a computing ecosystem configured to host execution of multiple program modules, in accordance with some embodiments of the invention.

FIG. 9 is a block diagram of apparatus for serving program modules, discovering modules and composing new modules within a delimited computing environment, according to some embodiments of the invention.

Ecosystem apparatus 900 of FIG. 9 comprises communication module 902 for communicating with clients, such as clients 910, and/or with third parties (e.g., external web sites and/or services). Communication module 902 may handle most or all communications between apparatus 900 and clients 910 (e.g., computing devices operated by users) and may be configured to employ virtually any communication protocols and formats, including but not limited to HTTP (Hypertext Transport Protocol), FTP (File Transfer Protocol), TCP (Transport Control Protocol), IP (Internet Protocol), SNMP (Simple Network Management Protocol), etc.

Workflow pattern matching mechanism 912 is adapted to monitor user behavior and compare patterns of user activity with patterns of activity indicative of known program modules. As described previously, finding a match allows ecosystem apparatus 900 to identify to a user one or more program modules that may be useful and that he or she may not be aware of.

Complementary module suggestion mechanism 914 is adapted to suggest a complementary program module to a user based on a match between the user's work activity and a pattern of activity reflective of the module, as discovered by mechanism 912. Mechanism 914 may alert the user via a notification widget or utility, and may present to the user information regarding the suggested module (e.g., description, user rating) to help him decide whether or not to use it.

Composite module creation mechanism 916 is adapted to facilitate creation of a new composite program module from two or more existing modules being operated by a user. As described previously, when a user is manipulating two or more program modules, especially modules that work cooperatively to complete a task or perform a function neither could perform alone, she may initiate the creation of a composite module that comprises the cooperative modules.

Mechanism 916, when activated, will generate a new module icon for the user's workspace library or toolbar to allow her to easily open all of the constituent program modules in the future. Mechanism 916 may also help the user share the new composite module with other users.

Module serving mechanism 918 is adapted to serve program modules to clients 910 (e.g., via communication module 902). The modules may include stand-alone or independent program modules and/or composite program modules that comprise multiple cooperative program modules. It may be noted that a given program module may be useful as an independent module and also be useful as one component of a composite module.

In other embodiments of the invention, the functions of any or all of the mechanisms of ecosystem apparatus 900 may be combined or further subdivided.

Figure 10:
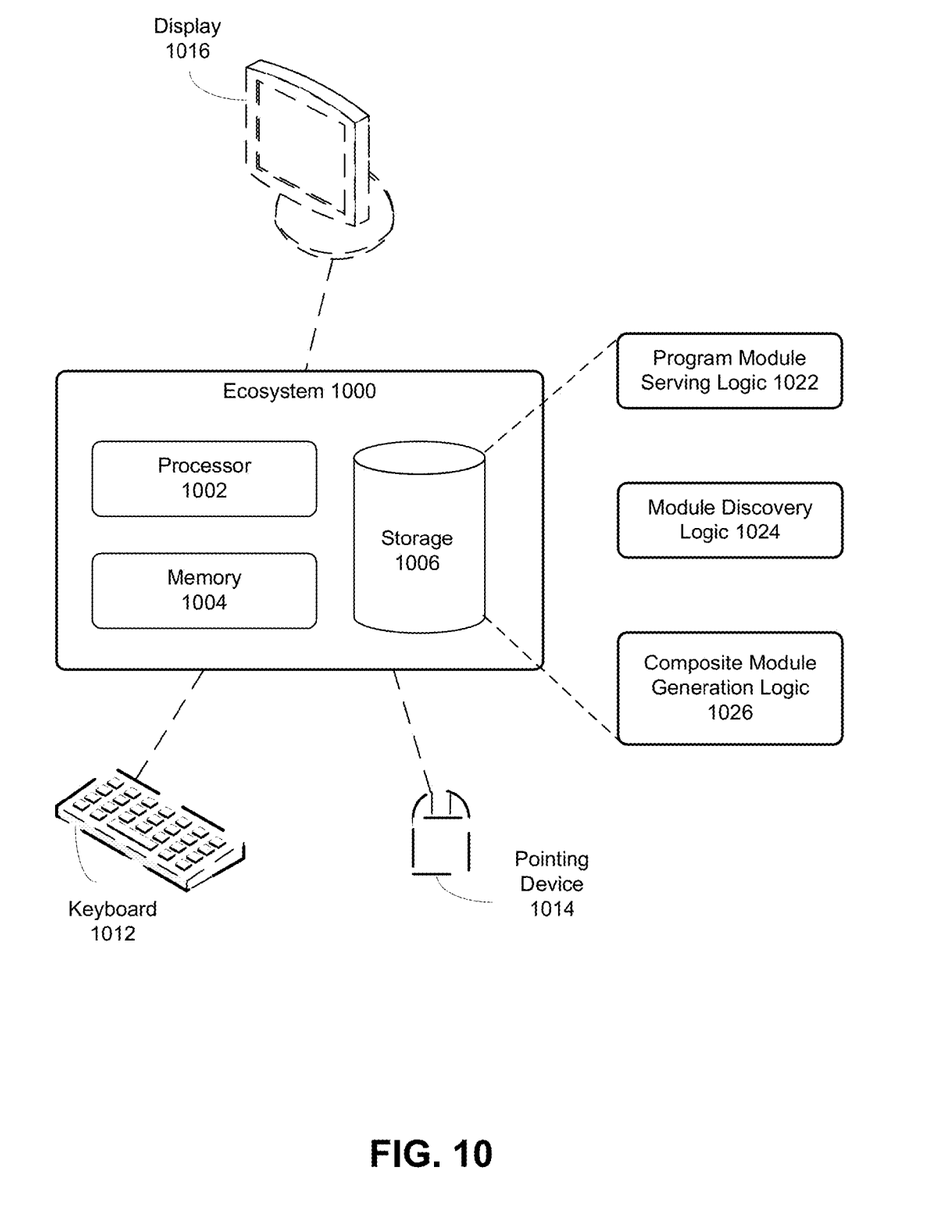
FIG. 10 is a block diagram of a computing ecosystem configured to host execution of multiple program modules, in accordance with some embodiments of the invention.

FIG. 10 is a block diagram of an automated behavioral coaching system, according to some embodiments of the invention.

Ecosystem 1000 of FIG. 10 comprises processor 1002, memory 1004 and storage 1006, which may comprise one or more optical and/or magnetic storage components. Ecosystem 1000 may be coupled (permanently or transiently) to keyboard 1012, pointing device 1014 and display 1016. In some embodiments, ecosystem 1000 may comprise a centralized or cloud-based server. Clients may connect to the system via a web browser, a mobile device, a desktop computer or workstation, etc., using wired and/or wireless connections.

Storage 1006 of the automated coaching system stores logic that may be loaded into memory 1004 for execution by processor 1002. Such logic includes program module serving logic 1022, module discovery logic 1024 and composite module generation logic 1026.

Program module serving logic 1022 comprises processor-executable instructions for serving program modules from ecosystem 1000 to any number of clients. The modules include independent and/or composite modules.

Module discovery logic 1024 comprises processor-executable instructions for helping a user discover a new and useful program module. Thus, logic 1024 may be configured to compare patterns of user workflow activity to functionality of known program modules, alert a user of the existence of a module that may complement her current task(s), and provide information regarding how the module operates.

Composite module generation logic 1026 comprises processor-executable instructions for constructing a composite program module to comprise two or more other modules. One or more of the other modules may themselves be composite program modules. Logic 1026 will also generate a new icon in the user's workspace for launching the composite module.

It may be noted that different users may independently create the same or similar composite modules. However, logic 1026 may also assist a user in sharing a composite module created by that user with other users.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of assembling a composite program module within a computing ecosystem hosting multiple program modules, the method comprising operating one or more computer processors to:
   execute a plurality of the multiple program modules within a first user's workspace within the ecosystem in response to the first user's activation of icons in the first user's workspace that correspond to the plurality of program modules;
   during execution of the plurality of program modules in the first user's workspace:
      observe a pattern of activity of the first user with the plurality of program modules; and
      temporarily visually alert the first user to one or more suggested program modules different from the plurality of program modules, wherein each suggested program module is designed to perform an operation compatible with the observed pattern of activity; and
   if the first user accepts a first suggested program module before the temporary visual alert expires:
      display a control for creating the composite program module to comprise the first suggested program module and the plurality of program modules; and
      if the first user activates the control, create the composite program module.

2. The method of claim 1, wherein:
   creating the composite program module comprises displaying in the first user's workspace a composite icon corresponding to the composite program module; and
   activating the composite icon automatically triggers execution of the first suggested program module and the plurality of program modules.

3. The method of claim 2, wherein said activating the composite icon causes the first suggested program module and the plurality of program modules to execute with the same spatial arrangements in the first user's workspace as exhibited when the first user activated the control.

4. The method of claim 1, further comprising, if the first user activates the control:
   enabling the first user to share the composite program module with one or more other users within the ecosystem.

5. The method of claim 1, further comprising:
   comparing the observed pattern of activity with stored patterns of activity associated with a subset of the multiple program modules, including the one or more suggest program modules.

6. The method of claim 1, wherein said alerting comprises issuing an audible alert.

7. The method of claim 1, wherein said alerting comprises issuing a visual alert within the first user's workspace.

8. The method of claim 1, further comprising, after said alerting:
   receiving a user input requesting additional information regarding the first suggested program module; and
   in response to the user input, displaying a description of the first suggested program module.

9. The method of claim 1, further comprising, after said alerting:
   receiving a user input requesting additional information regarding the first suggested program module; and
   in response to the user input, displaying a rating of the first suggested program module by other users.

10. The method of claim 1, further comprising, after said alerting:
    receiving a user input requesting additional information regarding the first suggested program module; and
    in response to the user input, offering the first user a video describing operation of the first suggested program module.

11. A method of assembling a composite program module within a computing ecosystem hosting program modules for execution within user workspaces, the method comprising:
    hosting execution of one or more ecosystem program modules, wherein the one or more ecosystem program modules are executed in response to a first user's activation, within an ecosystem workspace of the first user, of icons corresponding to the one or more ecosystem program modules;
    during execution of the one or more ecosystem program modules:
       observing a pattern of activity by the first user with the one or more ecosystem program modules; and without any request from the first user, indicating to the first user availability of one or more complementary program modules compatible with the observed pattern of activity;

executing a first complementary program module selected by the first user from the one or more complementary program modules;

displaying an actuable control in the first user's workspace; and in response to actuation of the control by the first user:
creating in the first user's workspace a new icon corresponding to a composite program module encompassing the one or more ecosystem program modules and the first complementary program module; and
enabling the first user to share the composite program module with other users;

wherein subsequent activation of the new icon when the one or more ecosystem program modules and the composite program module are inactive automatically triggers execution of the one or more ecosystem program modules and the first complementary program module with the same spatial arrangement exhibited at said actuation of the control.

12. The method of claim 11, further comprising, prior to said hosting execution:
storing patterns of workflow activity indicative of functionality of a subset of complementary program modules within the ecosystem program modules.

13. The method of claim 12, wherein said announcing comprises:
detecting a match between the observed pattern of activity and one or more of the stored patterns of workflow activity.

14. The method of claim 11, wherein upon said automatically triggered execution, the one or more ecosystem program modules and the first complementary program module commence execution with the same data with which they executed during said actuation of the control.

15. The method of claim 11, wherein upon said automatically triggered execution, the one or more ecosystem program modules and the first complementary program module commence execution with a different set of data than a set of data with which they executed during said actuation of the control.

16. The method of claim 11, wherein activation of an icon comprises clicking on the icon.

17. The method of claim 11, wherein activation of an icon comprises dragging the icon to a workspace.

18. A non-transitory computer-readable medium storing instructions that, when executed by a computer, cause the computer to perform a method of assembling a composite program module within a computing ecosystem hosting program modules for execution within user workspaces, the method comprising, at the computer:

hosting execution of one or more ecosystem program modules, wherein the one or more ecosystem program modules are executed in response to a first user's activation, within an ecosystem workspace of the first user, of icons corresponding to the one or more ecosystem program modules;

during execution of the one or more ecosystem program modules:
observing a pattern of activity by the first user with the one or more ecosystem program modules; and
without any request from the first user, indicating to the first user availability of one or more complementary program modules compatible with the observed pattern of activity;

executing a first complementary program module selected by the first user from the one or more complementary program modules;

displaying an actuable control in the first user's workspace; and in response to actuation of the control by the first user:
creating in the first user's workspace a new icon corresponding to a composite program module encompassing the one or more ecosystem program modules and the first complementary program module; and
enabling the first user to share the composite program module with other users;

wherein subsequent activation of the new icon when the one or more ecosystem program modules and the composite program module are inactive automatically triggers execution of the one or more ecosystem program modules and the first complementary program module with the same spatial arrangement exhibited at said actuation of the control.

* * * * *